(12) United States Patent
Yang

(10) Patent No.: US 6,883,914 B1
(45) Date of Patent: Apr. 26, 2005

(54) EYEGLASSES WITH ANGLE ADJUSTABLE TEMPLES

(75) Inventor: Shun-Tien Yang, Yung-Kang (TW)

(73) Assignee: All-Logic Int. Co., LTD, Yung-Kang (TW)

( * ) Notice: Subject to any disclaimer, the term of this patent is extended or adjusted under 35 U.S.C. 154(b) by 0 days.

(21) Appl. No.: 10/868,598

(22) Filed: Jun. 15, 2004

(51) Int. Cl.[7] ................................................ G02C 5/14
(52) U.S. Cl. ...................................................... 351/120
(58) Field of Search ................................. 351/119–121

(56) References Cited

U.S. PATENT DOCUMENTS 6,454,406 B1 * 9/2002 Guo ............................ 351/120
6,776,483 B1 * 8/2004 Wu .............................. 351/120

* cited by examiner

*Primary Examiner*—Huy Mai
(74) *Attorney, Agent, or Firm*—Ohlandt, Greeley, Ruggiero & Perle, LLP

(57) ABSTRACT

A pair of eyeglasses includes two temples connected to a lens seat unit by two connecting seats, respectively. Each of the connecting seats includes a first pivotal portion, an intermediate portion, and a second pivotal portion having two pivotal plates. Each of the intermediate portions has first and second vertical walls, and upper and lower horizontal walls so as to define a retaining space. Each of the temples includes a retaining portion inserted into the retaining space in the corresponding connecting seat, and a pivotal portion connected fixedly to the retaining portion and connected pivotally to the pivotal plates of the corresponding connecting seat. In each of the connecting seats, the first vertical wall is formed with a rib engaging a selected one of positioning slots in the retaining portion of the corresponding temple. The ribs and the positioning slots are concealed within the connecting seats.

5 Claims, 7 Drawing Sheets

US 6,883,914 B1

EYEGLASSES WITH ANGLE ADJUSTABLE TEMPLES

BACKGROUND OF THE INVENTION

1. Field of the Invention

This invention relates to a pair of eyeglasses, and more particularly to a pair of eyeglasses that includes two angle adjustable temples.

2. Description of the Related Art

Referring to FIG. 1, a pair of conventional eyeglasses 1 is shown to include a lens seat unit 11, and two temple assemblies disposed respectively on two opposite sides of the lens seat unit 11. Each of the temple assemblies includes a connecting seat 12 connected pivotally to the lens seat unit 11, and a temple 13 disposed behind the connecting seat 12. Each of the connecting seats 12 has a front coupling portion 121 connected pivotally to the lens seat unit 11, a rear retaining portion 122 that is formed with a retaining strip 123, and a pivot hole 124 that is disposed between the front coupling portion 121 and the retaining strip 123. Each of the temples 13 includes two vertical walls 131 disposed at two sides of the retaining portion 122 of the corresponding connecting seat 12 to define a retaining space 132. In each of the temples 13, one of the vertical walls 131 has an inner surface that is formed with a plurality of positioning slots 133, and the other one of the vertical walls 131 is formed with a window 134 therethrough. The eyeglasses 1 further include two pivot pins 14, each of which extends through the pivot hole 124 in the corresponding connecting seat 12 and the vertical walls 131 of the corresponding temple 13. The temples 13 are rotatable about the pivot pins 14 so as to engage the retaining strips 123 with selected ones of the positioning slots 133, thereby permitting adjustment of an inclination angle of each of the temples 13 relative to the corresponding connecting seat 12. The retaining strips 123 and the positioning slots 133 constitute cooperatively an adjusting unit. As the adjusting unit is visible through the window 134, the appearance of the eyeglasses 1 is marred.

FIG. 2 shows another conventional temple assembly 2, which includes a connecting seat 21 and a temple 22. The temple 22 includes a C-shaped retaining portion 221 defining a retaining space 222, and has a side surface that is formed with a plurality of positioning slots 223. The C-shaped retaining portion 221 is sleeved rotatably on a pivot pin 213 of the connecting seat 21. The connecting seat 21 is formed with a resilient arm 214 that has an integral rib 215, which engages a selected one of the positioning slots 223 in the C-shaped retaining portion of the temple 22. The rib 215 and the positioning slots 223 constitute cooperatively an adjusting unit. Likewise, the adjusting unit is exposed outwardly of the temple assembly 2, thereby marring the appearance of the temple assembly 2.

SUMMARY OF THE INVENTION

The object of this invention is to provide a pair of eyeglasses that includes an adjusting unit which is operable to adjust the inclination angles of two temples and which is concealed within two connecting seats so as not to mar the appearance of the eyeglasses.

According to this invention, a pair of eyeglasses includes two temples connected to a lens seat unit by two connecting seats, respectively. Each of the connecting seats includes a first pivotal portion, an intermediate portion, and a second pivotal portion having two pivotal plates. Each of the intermediate portions has first and second vertical walls, and upper and lower horizontal walls so as to define a retaining space. Each of the temples includes a retaining portion inserted into the retaining space in the corresponding connecting seat, and a pivotal portion connected fixedly to the retaining portion and connected pivotally to the pivotal plates of the corresponding connecting seat. In each of the connecting seats, the first vertical wall is formed with a rib engaging a selected one of positioning slots in the retaining portion of the corresponding temple. The ribs and the positioning slots are concealed within the connecting seats.

BRIEF DESCRIPTION OF THE DRAWINGS

These and other features and advantages of this invention will become apparent in the following detailed description of the preferred embodiments of this invention, with reference to the accompanying drawings, in which.

DETAILED DESCRIPTION OF THE PREFERRED EMBODIMENTS

Figure 1:
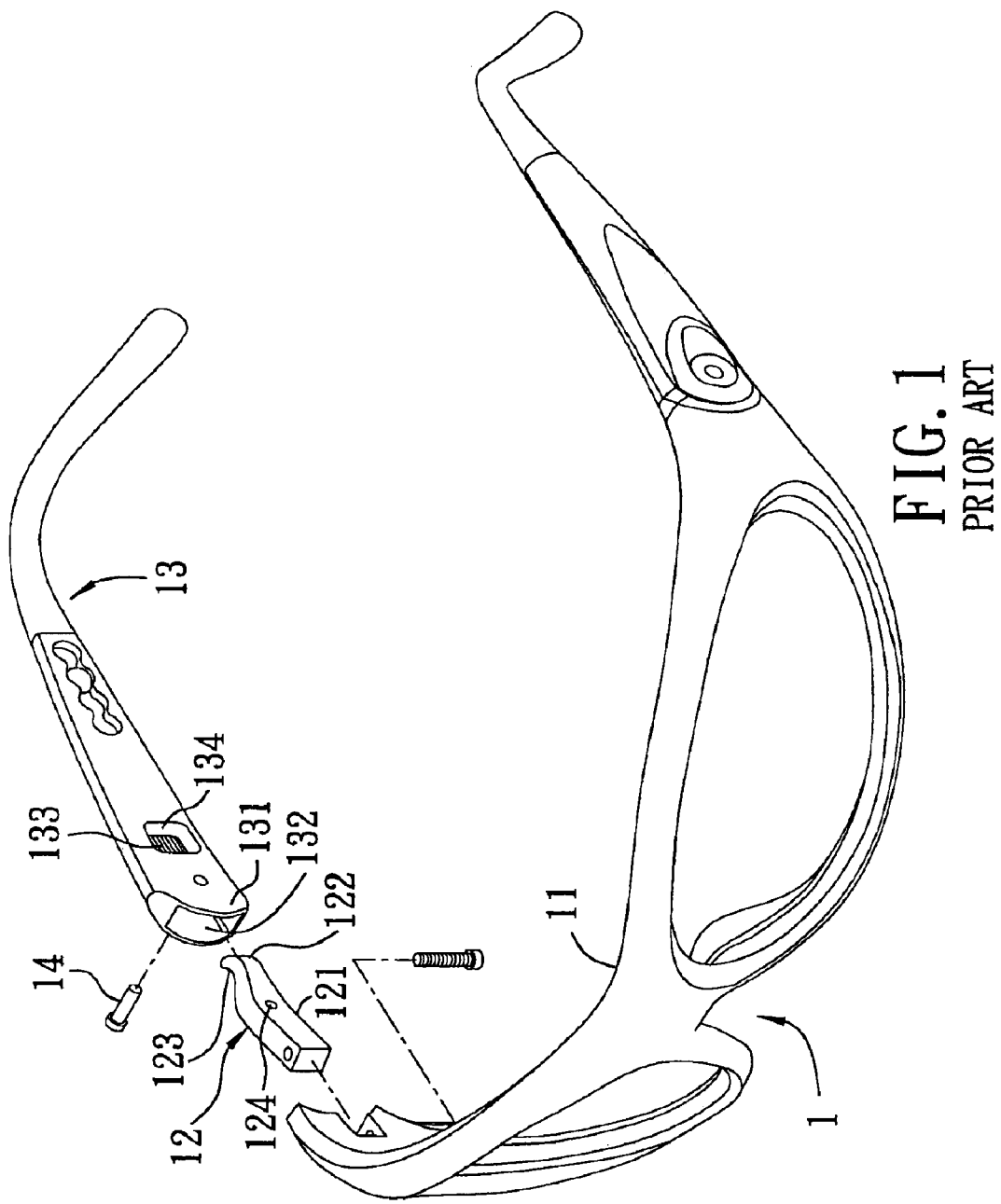
FIG. 1 is a partly exploded perspective view of a pair of conventional eyeglasses.
Figure 2:
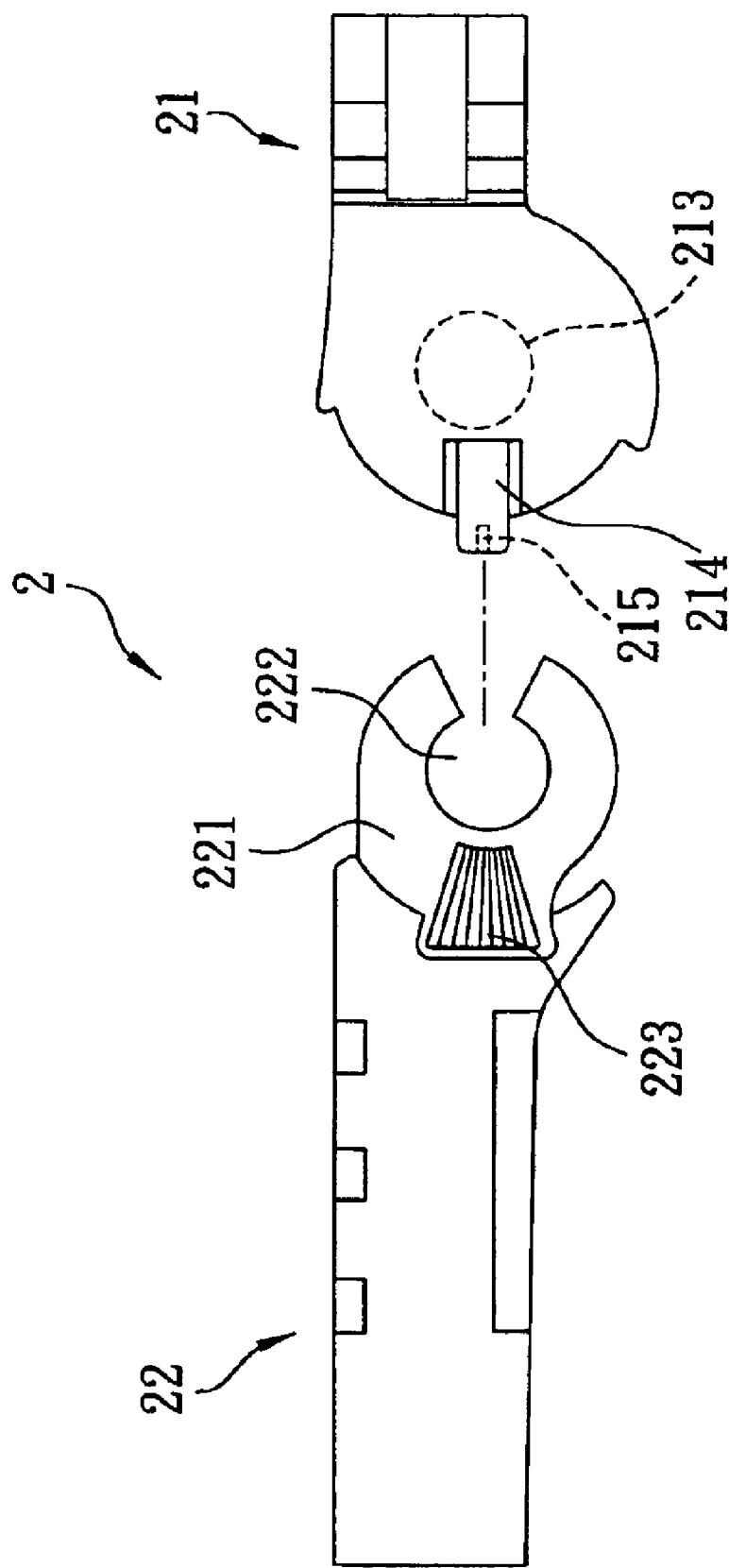
FIG. 2 is an exploded side view of a conventional temple assembly.

Before the present invention is described in greater detail in connection with the preferred embodiments, it should be noted that similar elements and structures are designated by like reference numerals throughout the entire disclosure.

Figure 3:
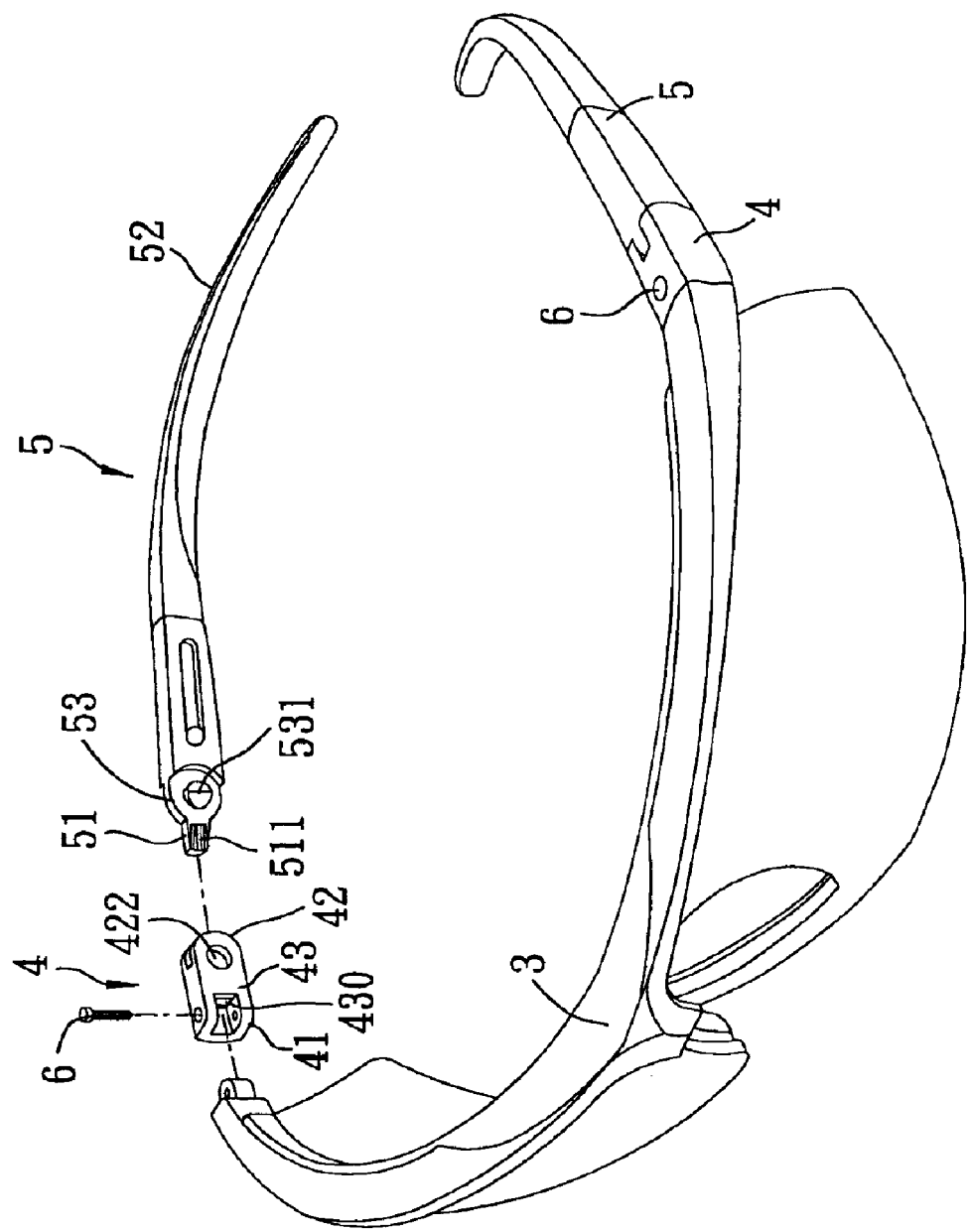
FIG. 3 is a partly exploded perspective view of the first preferred embodiment of a pair of eyeglasses according to this invention.
Figure 4:
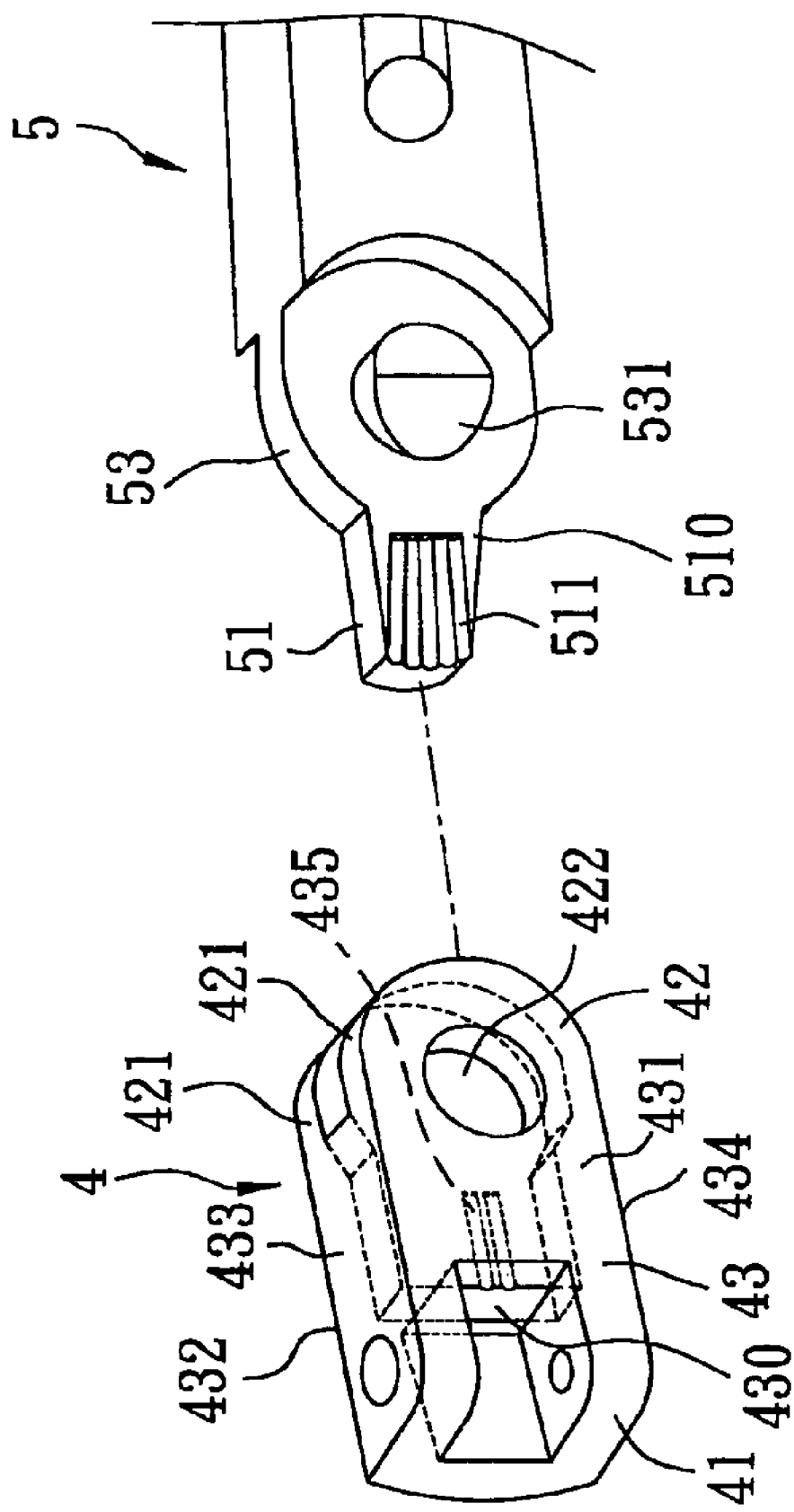
FIG. 4 is an exploded perspective view of a connecting seat and a temple of the first preferred embodiment.
Figure 5:
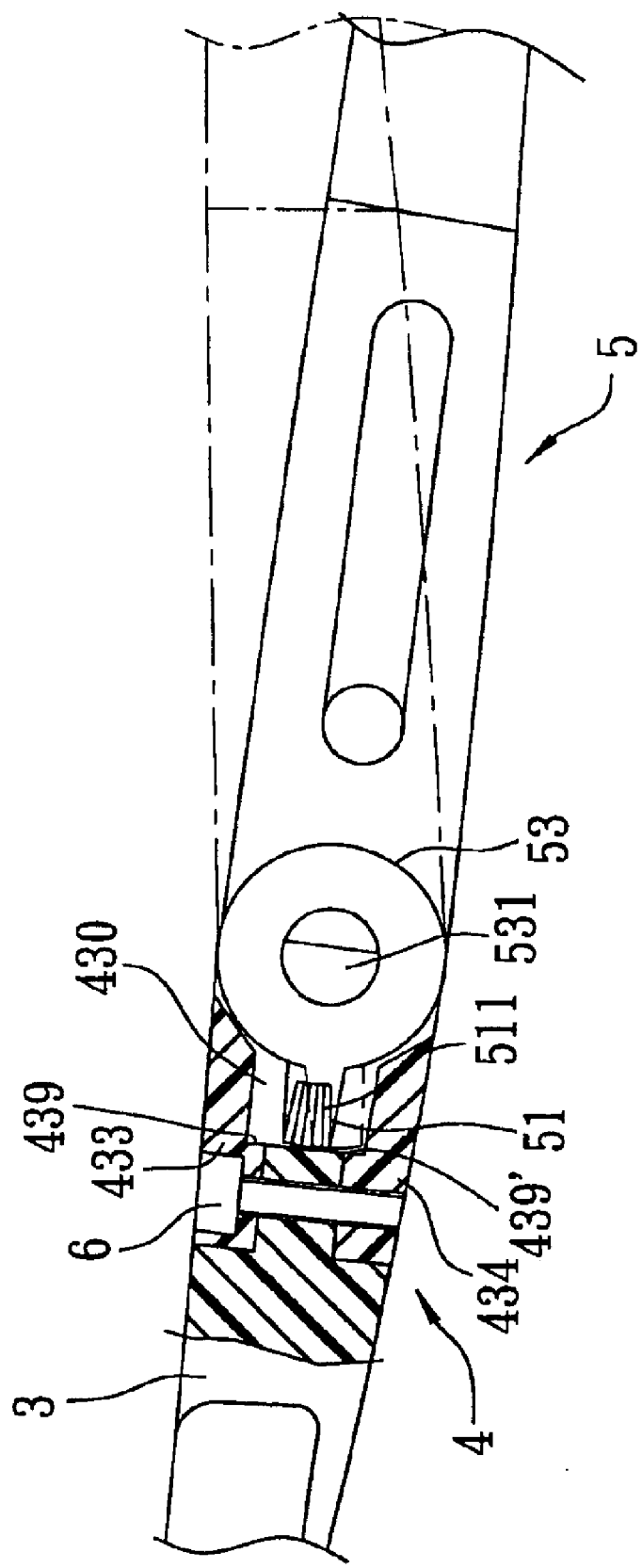
FIG. 5 is a schematic, fragmentary, partly sectional side view of the first preferred embodiment, illustrating rotation of the temple relative to the connecting seat.

Referring to FIGS. 3, 4, and 5, the first preferred embodiment of a pair of eyeglasses according to this invention is shown to include a lens seat unit 3, and two temple assemblies disposed respectively on two opposite sides of the lens seat unit 3. Each of the temple assemblies includes a connecting seat 4, a temple 5, and a bolt 6. The connecting seats 4 are connected respectively and rotatably to two opposite sides of the lens seat unit 3 by the bolts 6. The temples 5 are disposed respectively behind the connecting seats 4. Because the structures of the temple assemblies are the same, only one of the temple assemblies will be described in the succeeding paragraphs.

The connecting seat 4 includes a first pivotal portion 41 connected rotatably to the lens seat unit 3 by the bolt 6, a second pivotal portion 42 having two spaced-apart parallel vertical pivotal plates 421, and an intermediate portion 43 disposed between and formed integrally with the first and second pivotal portions 41, 42. The intermediate portion 43 has a pair of spaced-apart first and second vertical walls 431, 432, and a pair of spaced-apart upper and lower horizontal walls 433, 434 so as to define a retaining space 430 among the first and second vertical walls 431, 432 and the upper and lower horizontal walls 433, 434. The first vertical wall 431 is formed with two first ribs 435 that extend toward the second vertical wall 432 and into the retaining space 430.

The temple 5 includes a retaining portion 51 inserted into the retaining space 430 in the connecting seat 4, an ear-supported portion 52 adapted to be supported by an ear of a wearer (not shown), and a pivotal portion 53 disposed between and formed integrally with the retaining portion 51 and disposed between the pivotal plates 421 of the second pivotal portion 42 of the connecting seat 4. The pivotal portion 53 of the temple 5 is formed with two pivot pins 531 (only one is shown) that extend respectively and integrally from two opposite side surfaces thereof into circular holes 422 (only one is shown) in the pivotal plates 421 of the second pivotal portion 42 of the connecting seat 4. As such, the retaining portion 51 of the temple 5 can rotate within the connecting seat 4 about the pivot pins 531. The retaining portion 51 of the temple 5 has a first vertical side surface 510 that is formed with a plurality of first positioning slots 511. The temple 5 is rotatable relative to the connecting seat 4 so as to engage the first ribs 435 of the connecting seat 4 with two selected ones of the first positioning slots 511 in the temple 5, thereby permitting adjustment of an inclination angle of the temple 5 relative to the connecting seat 4.

The first ribs 435 of the connecting seat 4 and the first positioning slots 511 in the temple 5 constitute cooperatively an adjusting unit that is concealed within the connecting seat 4. Thus, the object of this invention can be achieved.

The upper horizontal wall 433 of the intermediate portion 43 of the connecting seat 4 has a bottom surface that is formed with an upper limiting groove 439. The lower horizontal wall 434 of the intermediate portion 43 of the connecting seat 4 has a top surface that is formed with a lower limiting groove 439'. The retaining portion 51 of the temple 5 is rotatable within the retaining space 430 in the connecting seat 4 to engage the upper and lower limiting grooves 439, 439' in the intermediate portion 43 of the connecting seat 4. As such, the rotation angle range of the temple 5 relative to the connecting seat 4 is increased.

Figure 6:
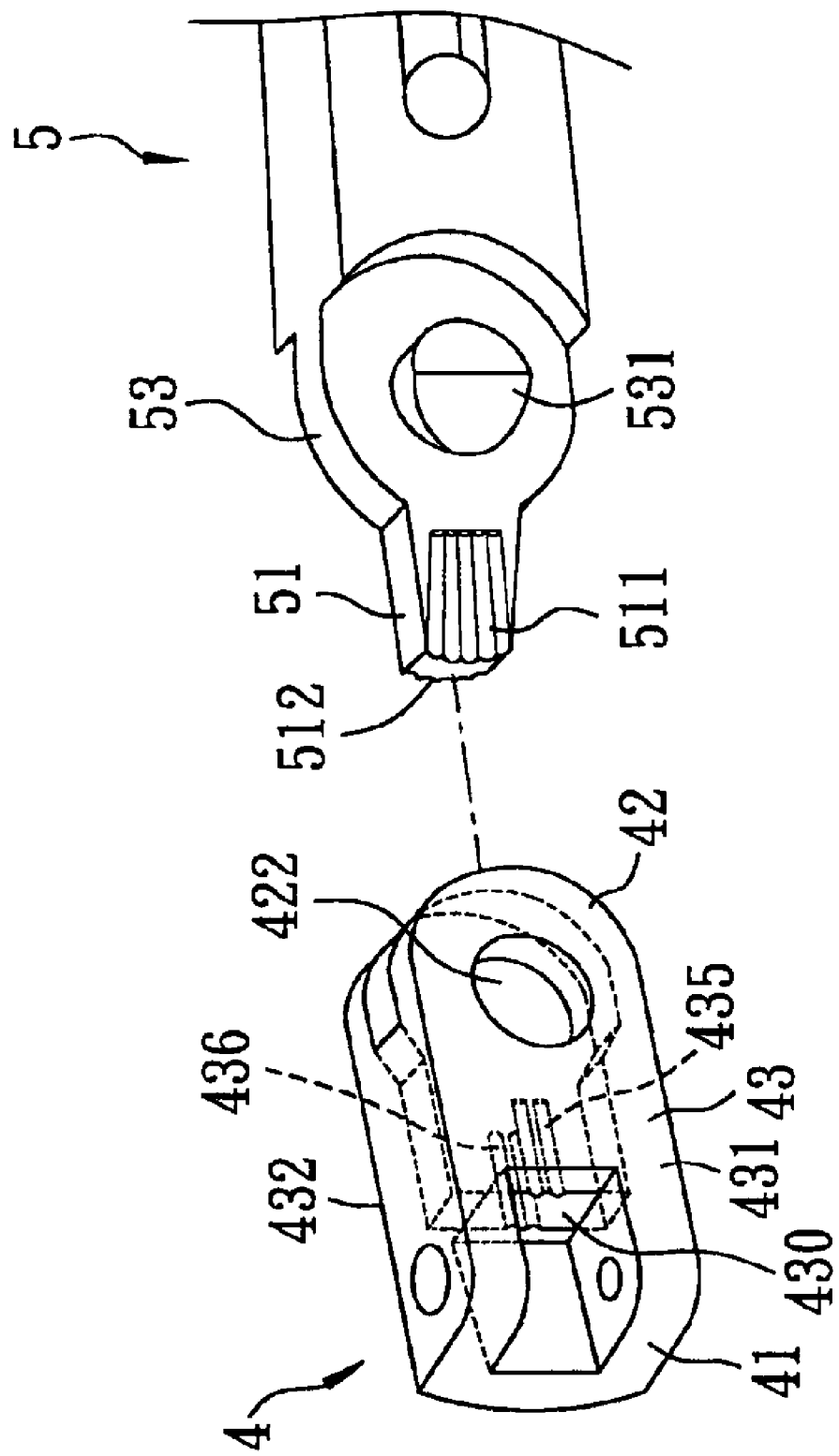
FIG. 6 is an exploded perspective view of a connecting seat and a temple of the second preferred embodiment of a pair of eyeglasses according to this invention.

FIG. 6 shows the second preferred embodiment of a pair of eyeglasses according to this invention, which is similar to the first preferred embodiment in construction. Unlike the first preferred embodiment, the adjusting unit further includes two second ribs 436 extending from the second vertical wall 432 of the intermediate portion 43 of the connecting seat 4 toward the first vertical wall 432 and aligned respectively with the first ribs 435, and a plurality of second positioning slots 512 aligned respectively with the first positioning slots 511 and formed in a second vertical side surface that is opposite to the first vertical side surface 510. The second ribs 436 of the connecting seat 4 engage respectively two selected ones of the second positioning slots 512 in the temple 5.

Preferably, each of the first ribs 435 has a thickness that is smaller than the depth of the first positioning slots 511 by 0.15 mm to 0.25 mm so as to facilitate movement of the first ribs 435 among the first positioning slots 511. Each of the second ribs 436 has a thickness that is smaller than the depth of the second positioning slots 511 by 0.15 mm to 0.25 mm so as to facilitate movement of the second ribs 436 among the second positioning slots 512.

Figure 7:
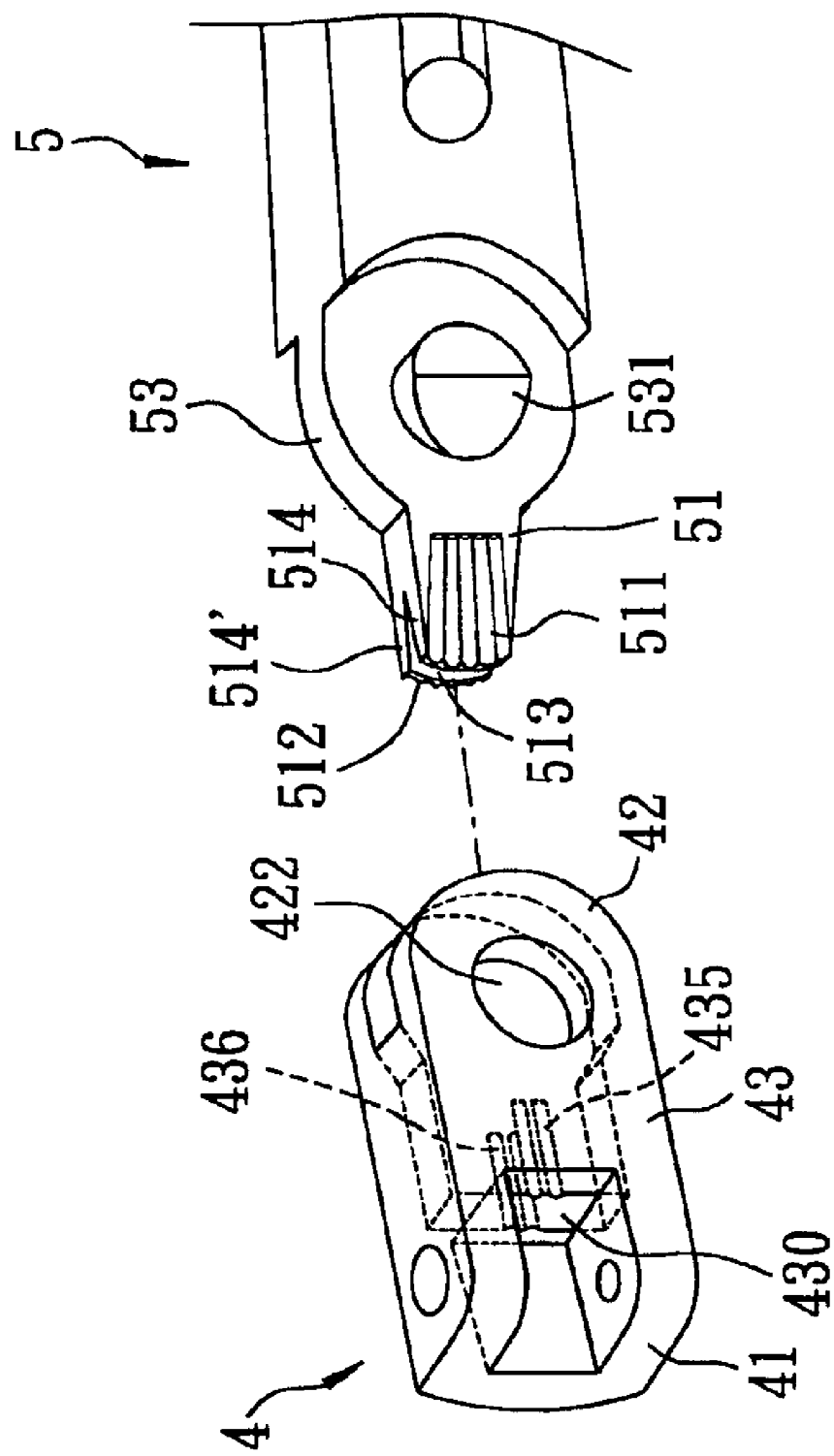
FIG. 7 is an exploded perspective view of a connecting seat and a temple of the third preferred embodiment of a pair of eyeglasses according to this invention.

FIG. 7 shows the third preferred embodiment of a pair of eyeglasses according to this invention, which is similar to the second preferred embodiment in construction except that the retaining portion 51 of the temple 5 has a bifurcated end that is distal from the pivotal portion 53 of the temple 5 and that is formed with a vertical groove 513 therethrough to define a pair of vertical first and second resilient plates 514, 514'. The first positioning slots 511 are formed in the first resilient plate 514. The second positioning slots 512 are formed in the second resilient plate 514'. As such, the first and second resilient plates 514, 514' in the temple 5 are movable toward each other so as to facilitate insertion of the retaining portion 51 of the temple 5 into the retaining space 430 in the connecting seat 4, movement of the first ribs 435 on the first resilient plate 514 among the first positioning slots 511, and movement of the second ribs 436 on the second resilient plate 514' among the second positioning slots 512.

With this invention thus explained, it is apparent that numerous modifications and variations can be made without departing from the scope and spirit of this invention. It is therefore intended that this invention be limited only as indicated by the appended claims.

I claim:

1. A pair of eyeglasses comprising:
   a lens seat unit; and
   two temple assemblies disposed respectively on two opposite sides of said lens seat unit, each of said temple assemblies including
      a connecting seat including a first pivotal portion, a second pivotal portion having two spaced-apart parallel vertical pivotal plates, and an intermediate portion disposed between and connected fixedly to said first and second pivotal portions and having a pair of spaced-apart first and second vertical walls, and a pair of spaced-apart upper and lower horizontal walls so as to define a retaining space among said first and second vertical walls and said upper and lower horizontal walls, said first vertical wall being formed with at least one first rib that extends toward said second vertical wall and into said retaining space, and
      a temple including a retaining portion inserted into said retaining space in said connecting seat, an ear-supported portion adapted to be supported by an ear of a wearer, and a pivotal portion disposed between and connected fixedly to said retaining portion and said ear-supported portion and disposed between and connected pivotally to said pivotal plates of said second pivotal portion of said connecting seat, said retaining portion having a first vertical side surface that is formed with a plurality of first positioning slots, said first rib of said first vertical wall of said intermediate portion of said connecting seat being rotatable relative to said temple so as to engage a selected one of said first positioning slots in said connecting seat so as to permit adjustment of an inclination angle between said temple and said connecting seat.

2. The pair of eyeglasses as claimed in claim 1, wherein in each of said temple assemblies, said second vertical wall of said intermediate portion of said connecting seat is formed with at least one second rib that extends toward said first vertical wall of said intermediate portion of said connecting seat and that is aligned with said first rib of said first vertical wall of said intermediate portion of said connecting seat, said retaining portion of each of said temples further has a second vertical side surface that is opposite to said first vertical side surface and that is formed with a plurality of second positioning slots, and in each of said temple assemblies, said second rib of said second vertical wall of said intermediate portion of said connecting seat is aligned with said first rib of said first vertical wall of said intermediate portion of said connecting seat, and is rotatable relative to said connecting seat to engage a selected one of said second positioning slots in said second vertical side surface of said retaining portion of said temple.

3. The pair of eyeglasses as claimed in claim 2, wherein each of said first and second positioning slots in said retaining portions of said temples has a depth, each of said first ribs of said first vertical walls of said intermediate portions of said connecting seats having a thickness that is smaller than said depth of a corresponding one of said first positioning slots by 0.15 mm to 0.25 mm, each of said second ribs of said second vertical walls of said intermediate portions of said connecting seats having a thickness that is smaller than the depth of a corresponding one of said second positioning slots by 0.15 mm to 0.25 mm.

4. The pair of eyeglasses as claimed in claim 2, wherein, in each of said temple assemblies, said retaining portion of said temple has a bifurcated end that is distal from said pivotal portion of said temple and that is formed with a vertical groove therethrough to define a pair of vertical first and second resilient plates, said first positioning slots in said retaining portion of each of said temples being formed in said first resilient plate of said retaining portion of a corresponding one of said temples, said second positioning slots in said retaining portion of each of said temples being formed in said second resilient plate of said retaining portion of the corresponding one of said temples, said first and second resilient plates in each of said temples being movable toward each other so as to facilitate insertion of said retaining portions of said temples into said retaining spaces in said connecting seats, movement of each of said first ribs on a corresponding one of said first resilient plates among said first positioning slots in said retaining portion of the corresponding one of said temples, and movement of each of said second ribs on a corresponding one of said second resilient plates among said second positioning slots in said retaining portion of the corresponding one of said temples.

5. The pair of eyeglasses as claimed in claim 1, wherein each of said upper horizontal walls of said intermediate portions of said connecting seats has a bottom surface that is formed with an upper limiting groove, each of said lower horizontal walls of said intermediate portions of said connecting seats having a top surface that is formed with a lower limiting groove, in each of said temple assemblies, said retaining portion of said temple being rotatable within said retaining space in said connecting seat to engage said upper and lower limiting grooves in said intermediate portion of said connecting seat, whereby, rotation angle range of said temples relative to said connecting seats are increased.

* * * * *